United States Patent
Phillips

(10) Patent No.: US 7,020,254 B2
(45) Date of Patent: Mar. 28, 2006

(54) ESCALATION TRACKING SYSTEM

(75) Inventor: W. Mitch Phillips, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/281,484

(22) Filed: Oct. 28, 2002

(65) Prior Publication Data

US 2004/0081301 A1   Apr. 29, 2004

(51) Int. Cl.
*H04M 15/00* (2006.01)
*G03F 17/30* (2006.01)
*G06F 15/173* (2006.01)

(52) U.S. Cl. ............... 379/114.04; 379/114.03; 379/145; 707/3; 707/102; 709/217

(58) Field of Classification Search .......... 379/111, 379/114.01, 114.04, 114.14, 116, 119, 121.05, 379/126, 143, 145, 114.03; 707/3, 102, 104.1, 707/204; 709/217, 223, 224

See application file for complete search history.

(56) References Cited

U.S. PATENT DOCUMENTS

| | | | | |
|---|---|---|---|---|
| 5,333,183 A * | 7/1994 | Herbert | ......... | 379/112.07 |
| 5,970,129 A * | 10/1999 | Asfar et al. | ......... | 379/144.01 |
| 6,188,753 B1 * | 2/2001 | Afsar et al. | ......... | 379/114.14 |
| 6,373,935 B1 * | 4/2002 | Afsar et al. | ......... | 379/145 |
| 6,385,444 B1 * | 5/2002 | Peschel et al. | ......... | 455/405 |
| 6,535,728 B1 * | 3/2003 | Perfit et al. | ......... | 455/410 |
| 6,684,213 B1 * | 1/2004 | Schell et al. | ......... | 707/10 |
| 6,782,388 B1 * | 8/2004 | Majewski et al. | ......... | 707/10 |
| 6,934,749 B1 * | 8/2005 | Black et al. | ......... | 709/224 |

* cited by examiner

*Primary Examiner*—Binh K. Tieu
(74) *Attorney, Agent, or Firm*—Thomas, Kayden, Horstemeyer & Risley

(57) ABSTRACT

A system for tracking billing escalation records includes a processing device configured to provide for creating, tracking and forwarding escalation records, and databases adapted to communicate with the processing device. The databases are configured to provide data on the escalation records. In one embodiment, the databases include tables that are configured to provide data on escalation records such as current escalations, priority codes, investigators, department codes, investigation center department codes, case status, archives, among others. Other systems and methods are also provided.

31 Claims, 19 Drawing Sheets

---

2ND-LEVEL ESCALATION SCRUB FORM ← 900

CASE INFORMATION ← 902

| | | | |
|---|---|---|---|
| INV CTR ESCALATOR ID | ESCO3 | INVESTIGATOR | HAMILTON |
| DEPARTMENT CODE | NCMAC | CASE NUMBER | 249488 |
| CREATE DATE | 11/15/01 | PRIORITY | N |
| COMMENTS | OUTGOING USAGE RECORDING ON AN INCOMING USOC. INVALID USOC COMBINATION | | |

904 → ESCALATION LEVEL | SECOND | ESCALATION ID 2463

| 1ST-LEVEL ESCALATION DATA ← 906 | | |
|---|---|---|
| DATE ESCALATED TO 1ST | 12/10/01 | PHONE |
| 1ST-LEVEL ESCALATION CONTACT | SARA SMITH | (615) 555-1445 |
| 2ND-LEVEL ESCALATION DATA ← 908 | | |
| 2ND-LEVEL ESCALATION CONTACT | ROBIN REID | (615) 555-1446 |
| 2ND-LEVEL CONTACT SCRUBBED? | ☐ | PHONE |
| 3RD-LEVEL ESCALATION DATA ← 910 | | |
| 3RD-LEVEL ESCALATION CONTACT | PATRICK ZOE | (615) 555-1447 |
| 3RD-LEVEL CONTACT SCRUBBED? | ☐ | PHONE |

RECORD 1 OF 3

FIG. 6

| INV CTR ESC ID | CASE NUMBER | ESC ID | INVESTIGATOR | DEPT CODE | PRIORITY | ESC LEVEL | STATUS | COMMENTS |
|---|---|---|---|---|---|---|---|---|
| ESC03 | 244764 | 682 | HAMILTON | SFFABCDE | N | THIRD | OPEN | CSR ANS. RECORDS NEED UPDATING |
| | 244763 | 782 | KEITH | GAIS213 | N | THIRD | OPEN | CSR ANS. NEED TO DISC. |
| | 245333 | 633 | JACKSON | SFFIU345 | N | SECOND | MANAGER H | # WORKING. NEED TO EST BILLING |
| | 267890 | 452 | SMITH | GAIS213 | N | THIRD | MANAGER H | CSR ANS. NEED TO DISC |
| | 232289 | 675 | SMITH | SFFABCDE | N | THIRD | OPEN | SVC ORDER NEEDS TO BE COMPLETED |

PAGE 1 OF 16

ESCALATION SCRUB REPORT

| ID/ LEVEL | INV CTR ESC ID/ INVESTIGATOR | DEPT | CASE | PRIO | CASE DATE | COMMENTS | 1ST, 2ND, 3RD LEVEL ESCALATION CONTACTS | 1ST, 2ND, 3RD LEVEL ESCALATION PHONE NOS. |
|---|---|---|---|---|---|---|---|---|
| 2456 SECOND | ESC02 HAMILTON | SFFABCDE | 305773 | N | 7/3/02 | ONGOING USAGE RECORDING ON AN INCOMING USOC | JOHN JONES HUGH SMITH MARY TOM | (615) 123-4567 (615) 876-5432 (615) 401-4321 |
| 3222 SECOND | ESC02 KEITH | GAIS213 | 305888 | N | 7/7/02 | BILLING RECORDS NEED TO BE UPDATED | MARK ANTON JIM BLACK KEN ODOM | (205) 633-3456 (205) 876-1234 (205) 876-3324 |
| 2567 SECOND | ESC02 SMITH | SFFIU345 | 306232 | N | 7/27/02 | ACCTING HAS A FLAT RATE USOC | JACK STEP WILLIE ESTER GREG TUNY | (205) 633-3377 (205) 633-3365 (205) 876-3455 |

802, 804, 806, 808, 810, 812, 814, 816, 818

800

PAGE 1 OF 1

FIG. 9

2ND-LEVEL ESCALATION SCRUB FORM ← 900

CASE INFORMATION ← 902

| | | | | |
|---|---|---|---|---|
| INV CTR | | INVESTIGATOR | HAMILTON | |
| ESCALATOR ID | ESCO3 | CASE NUMBER | 249488 | |
| DEPARTMENT CODE | NCMAC | PRIORITY | N | |
| CREATE DATE | 11/15/01 | | | |
| COMMENTS | OUTGOING USAGE RECORDING ON AN INCOMING USOC. INVALID USOC COMBINATION | | | |

ESCALATION LEVEL: SECOND        ESCALATION ID: 2463

← 904

1ST-LEVEL ESCALATION DATA ← 906
DATE ESCALATED TO 1ST: 12/10/01
1ST-LEVEL ESCALATION CONTACT: SARA SMITH        (615) 555-1445 PHONE

2ND-LEVEL ESCALATION DATA ← 908
2ND-LEVEL ESCALATION CONTACT: ROBIN REID        (615) 555-1446 PHONE
2ND-LEVEL CONTACT SCRUBBED? ☐                                PHONE

3RD-LEVEL ESCALATION DATA ← 910
3RD-LEVEL ESCALATION CONTACT: PATRICK ZOE       (615) 555-1447 PHONE
3RD-LEVEL CONTACT SCRUBBED? ☐

RECORD 1 OF 3

FIG. 11

ESCALATION ARCHIVES 1100

| ID 1102 | INV CTR ESC ID 1104 | DEPT CASE 1106 | PRIO 1108 | ESC DATE LEVEL 1110 | 1ST-LEVEL DATE 1ST-LEVEL CONTACT 1112 | 2ND-LEVEL DATE 2ND-LEVEL CONTACT 1114 | 3RD-LEVEL DATE 3RD-LEVEL CONTACT 1116 | CLOSURE DATE 1118 | ARCHIVE DATE 1120 |
|---|---|---|---|---|---|---|---|---|---|
| 3 | ESCO2 HAMILTON | SFFABCDE 284007 | N | 9/3/01 FIRST | 10/3/01 JONES | HUGHES | SMYTH | 11/3/01 | 11/15/01 |
| 4 | ESCO2 KEITH | GAIS213 320029 | N | 10/1/01 THIRD | 11/1/01 MARK | 12/1/01 WEST | 2/1/02 THORPE | 2/2/02 | 2/26/02 |
| 5 | ESCO2 SMITH | SFFIU345 283999 | N | 9/10/01 SECOND | 10/10/01 TOM | 12/10/01 BROWN | STONE | 12/12/01 | 1/3/02 |
| 6 | ESCO2 GAITOR | GAIS213 329090 | N | 1/7/02 FIRST | 2/7/02 MARK | WEST | STONE | 3/7/02 | 3/27/02 |
| 9 | ESCO2 JACKSON | SFFABCDE 293245 | N | 1/5/02 THIRD | 2/5/02 KELLY | 4/5/02 LEE | 6/5/02 WATERS | 6/8/02 | 6/17/02 |

PAGE 1 OF 1

FIG. 13

2ND-LEVEL ESCALATIONS

| ESC. ID | INV CTR ESC ID/ INVESTIGATOR | DEPT | CASE | PRI | CASE DATE | COMMENTS | 1ST-LEVEL ESC. DATE | 1ST-LEVEL ESCALATION CONTACT | 2ND-LEVEL ESCALATION CONTACT |
|---|---|---|---|---|---|---|---|---|---|
| 2456 | ESC02 HAMILTON | SFFABCDE | 305773 | N | 7/3/02 | ONGOING USAGE RECORDING ON AN INCOMING USOC | 8/15/02 | JOHN JONES (615) 123-4567 | HUGH SMITH (615) 876-5432 |
| 3222 | ESC02 KEITH | GAIS213 | 305888 | N | 7/7/02 | BILLING RECORDS NEED TO BE UPDATED | 8/15/02 | MARK ANTON (205) 633-3456 | JIM BLACK (205) 876-1234 |
| 2567 | ESC02 SMITH | SFFIU345 | 306232 | N | 7/27/02 | ACCTING HAS A FLAT RATE USOC | 8/15/02 | JACK STEP (205) 633-3377 | WILLIE ESTER (205) 633-3365 |

PAGE 1 OF 11

FIG. 14

3RD-LEVEL ESCALATIONS

| ESC. ID | INV CTR ESC ID/ INVESTIGATOR | DEPT | CASE | PRI | CASE DATE | COMMENTS | 1ST-LEVEL, 2ND-LEVEL ESC. DATE | 1ST, 2ND, 3RD-LEVEL ESCALATION CONTACTS, PHONE NUMBER |
|---|---|---|---|---|---|---|---|---|
| 2456 | ESC02 HAMILTON | SFFABCDE | 223777 | N | 4/3/02 | MEMORY CALL-EST BILLING RECORDS OR DISC | 5/30/02 7/10/02 | JOHN JONES (615) 123-4567<br>HUGH SMITH (615) 876-5432<br>MARK TOM (615) 401-4321 |
| 3222 | ESC02 KEITH | GAIS213 | 258932 | N | 4/7/02 | MEMORY CALL-EST BILLING RECORDS OR DISC | 5/9/02<br>7/10/02 | MARK ANTON (205) 633-3456<br>JIM BLACK (205) 876-1234<br>KEN ODOM (205) 876-3324 |
| 2567 | ESC02 SMITH | SFFIU345 | 289309 | N | 4/12/02 | MEMORY CALL-EST BILLING RECORDS OR DISC | 6/1/02 7/10/02 | JACK STEP (205) 633-3377<br>WILLIE ESTER (205) 633-3365<br>GREG TUNY (205) 876-3455 |

1402 1404 1406 1408 1410 1412 1414 1416 1418

400

PAGE 1 OF 1

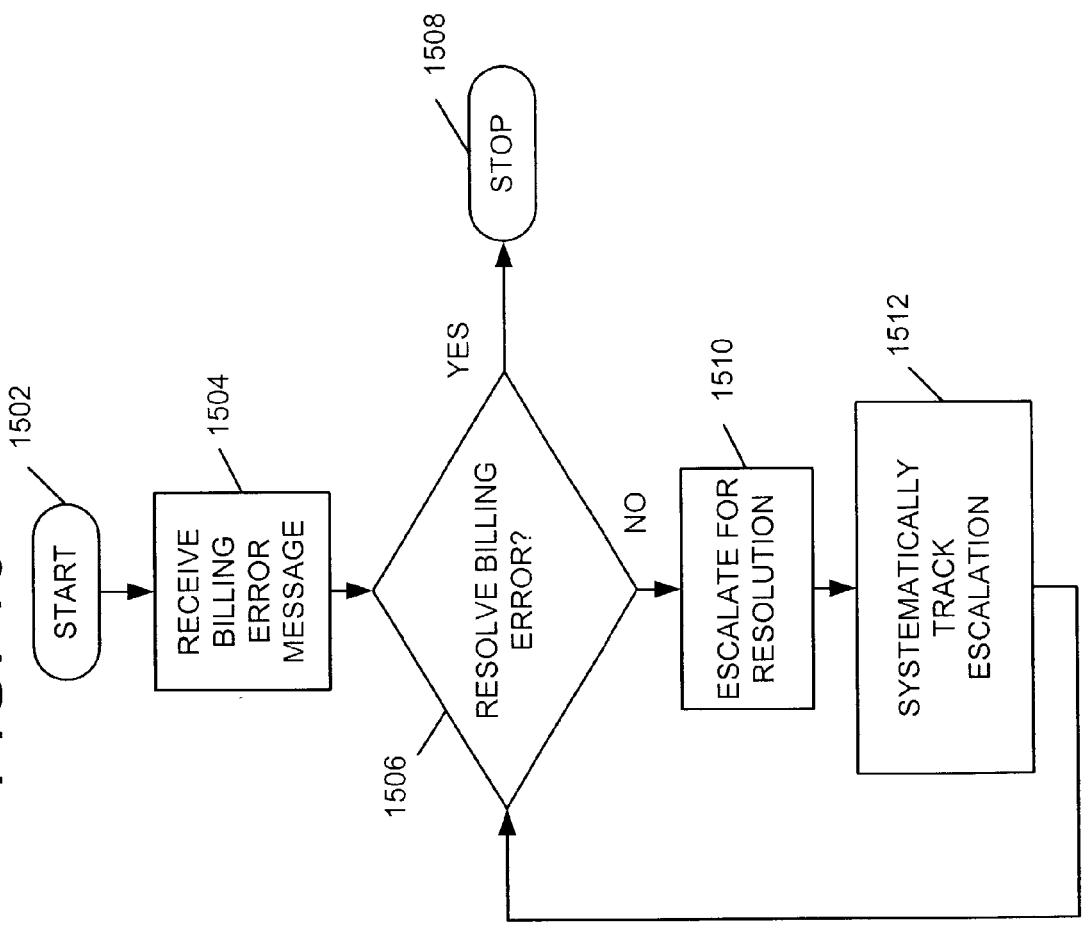

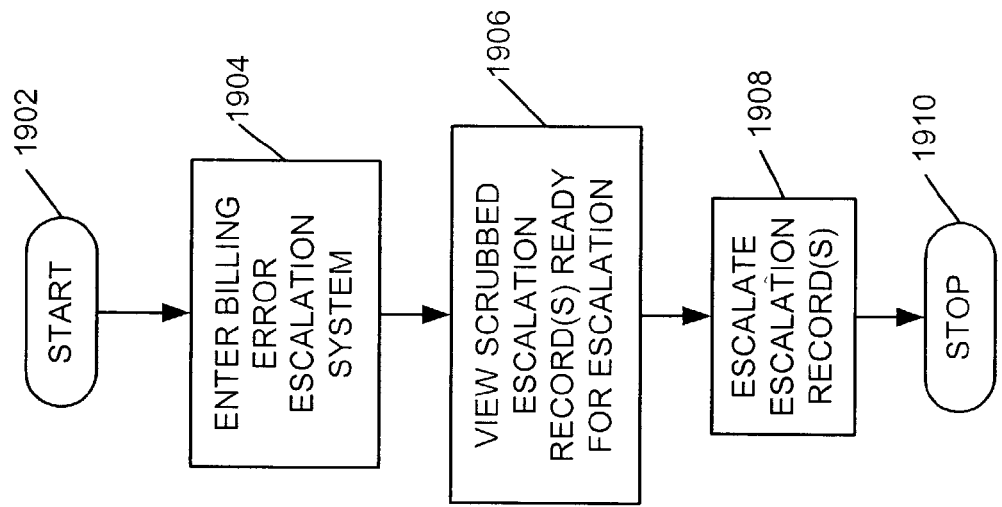

ESCALATION TRACKING SYSTEM

TECHNICAL FIELD

The present invention is generally related to billing systems and, more particularly, is related to tracking billing errors.

BACKGROUND OF THE INVENTION

The use of telephones has grown exponentially over recent years. Subscribers are utilizing wireless telephones, wireline telephones, facsimile machines, personal computers, and pagers, among other devices, to place telephone voice and/or data calls. As a result of these telephone calls, telecommunications networks process billions of subscriber transactions. The telecommunications companies have to correlate these transactions to a subscriber's telephone service calling plan such that the subscriber can be properly billed. In some instances, billing errors occur, and the telecommunications companies are unable to automatically process the transaction and/or generate a bill to the subscriber. Many billing errors can occur in a month, and the voluminous quantity of errors requires investigation by personnel responsible for resolving billing errors. Quickly resolving billing errors increases the likelihood of the telecommunications company receiving payment for the transaction.

Often, the investigation involves escalating the problem until resolution. Typically, escalating a problem requires personnel to place numerous contacts to individuals and organizations, and accessing several systems to resolve the billing errors. The escalation may take place over several hours, days, weeks or months. During the escalation process, personnel need to keep track of the progress of the resolution of the billing error. Currently, tracking escalation involves utilizing manual processes, such as preparing handwritten notes, rudimentary spreadsheets, or making mental notes of the status of the billing error. Typically, personnel involved in these functions are organized in billing centers and handle many billing errors per month. Managing the escalation process including supervising personnel and tracking the progress of a large volume of billing errors quickly becomes unmanageable when the escalation process involves utilizing manual processes created by each worker.

Thus, a heretofore-unaddressed need exists for a solution that addresses the aforementioned deficiencies and inadequacies.

SUMMARY OF THE INVENTION

The preferred embodiments of the present invention provide systems and methods for tracking billing error escalations.

Briefly described, in architecture, one preferred embodiment of one system, among others, can be implemented as follows. An escalation tracking system comprises a processing device configured to provide for creating, tracking and forwarding escalation records, and a plurality of databases adapted to communicate with the processing device, the plurality of databases configured to provide data on the escalation records.

The preferred embodiment of the present invention can also be viewed as providing methods for providing an escalation tracking system. In this regard, one embodiment of such a method, among others, can be broadly summarized by the following steps: creating an escalation record; scrubbing the escalation record; and tracking the escalation record.

Another preferred embodiment of the present invention can be viewed as providing methods for scrubbing an escalation record. In this regard, one embodiment of such a method, among others, can be broadly summarized by the following steps: reviewing outstanding escalation records; verifying accuracy of information on the escalation records; and marking the escalation records as scrubbed.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 6 is a block diagram depicting one preferred embodiment of a display of a report showing escalations by an investigation center of an escalation tracking system.

FIG. 8 is a block diagram depicting one preferred embodiment of a display of an escalation scrub report of an escalation tracking system.

FIG. 9 is a block diagram depicting one preferred embodiment of a display of an escalation scrub form of an escalation tracking system.

FIG. 11 is a block diagram depicting a display of an alternative preferred embodiment of an escalation archive report of an escalation tracking system.

FIG. 13 is a block diagram depicting a display of a manager escalation report of an escalation tracking system.

FIG. 14 is a block diagram depicting a display of a preferred embodiment of a manager escalation report of an escalation tracking system.

FIG. 15 is a flow chart depicting general functionality, in accordance with one preferred embodiment, of an implementation of an escalation tracking system.

FIG. 19 is a flow chart depicting functionality, in accordance with one preferred embodiment, of an implementation of reviewing and escalating scrubbed escalation records of an escalation tracking system.

DETAILED DESCRIPTION OF THE PREFERRED EMBODIMENTS

Disclosed herein are systems and methods for providing an escalation tracking system. To facilitate description of the inventive systems, an example system that can be used to implement the systems and methods for providing an escalation tracking system is discussed with reference to the figures. Although this system is described in detail, it will be appreciated that this system is provided for purposes of illustration only and that various modifications are feasible without departing from the inventive concept. After the example system has been described, an example of the operation of the system will be provided to explain the manner in which the system can be used to provide an escalation tracking system. The scope of the invention includes escalation systems outside the billing and telecom contexts, i.e., other environments needing management of complaints or other types of escalations.

Figure 1:
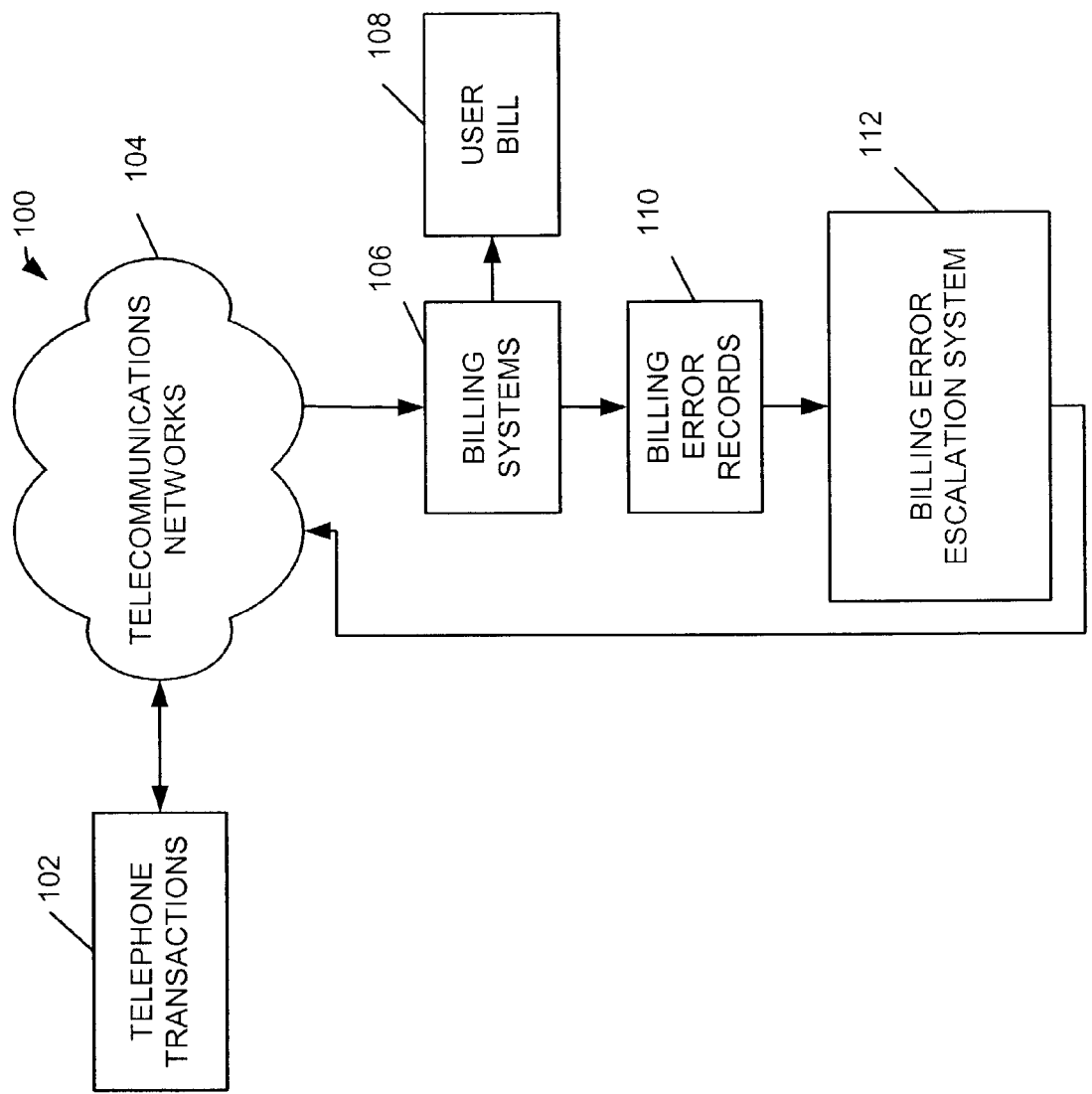
FIG. 1 is a block diagram depicting a preferred embodiment of an escalation tracking system.

Referring now in more detail to the drawings, in which like numerals indicate corresponding parts throughout the several views, FIG. 1 is a block diagram depicting a preferred embodiment of an escalation tracking system 100 in a telecommunications billing context. A customer of a telecommunications service provider utilizes telephony devices, such as a telephone, computer, facsimile machine, wireless device, among others, to make telephone transactions 102 that traverse the telecommunications network 104. The telecommunications network 104 may be any type of communication network employing any network topology, transmission medium, or network protocol. For example, such a network may be any public or private packet-switched or other data network, including the Internet, circuit-switched network, such as the public switched telecommunications network (PSTN), wireless network, or any other desired communications infrastructure and/or combination of infrastructures. In a preferred embodiment, telephone usage is recorded as telephone transaction 102 by equipment, such as equipment associated with a telecommunications switch in the telecommunications network 104. Billing systems 106 are coupled to the equipment in telecommunications network 104 to capture transaction usage. Typically, the usage records are compared to a customer's service plan. Subsequently, a bill 108 is rendered to the user or subscriber for payment.

In some cases, an error occurs in the billing process, and billing error records 110 are generated by the billing systems 106. Normally, the billing error records 110 require handling on an exception basis to obtain resolution. In one preferred embodiment, the billing error records 110 are sent to a billing error escalation system 112 for investigation, tracking and resolution of billing errors. The billing error escalation system 112 couples to the telecommunications network 104 such that a user of the system 112 can send electronic mail messages to other personnel.

Figure 2:
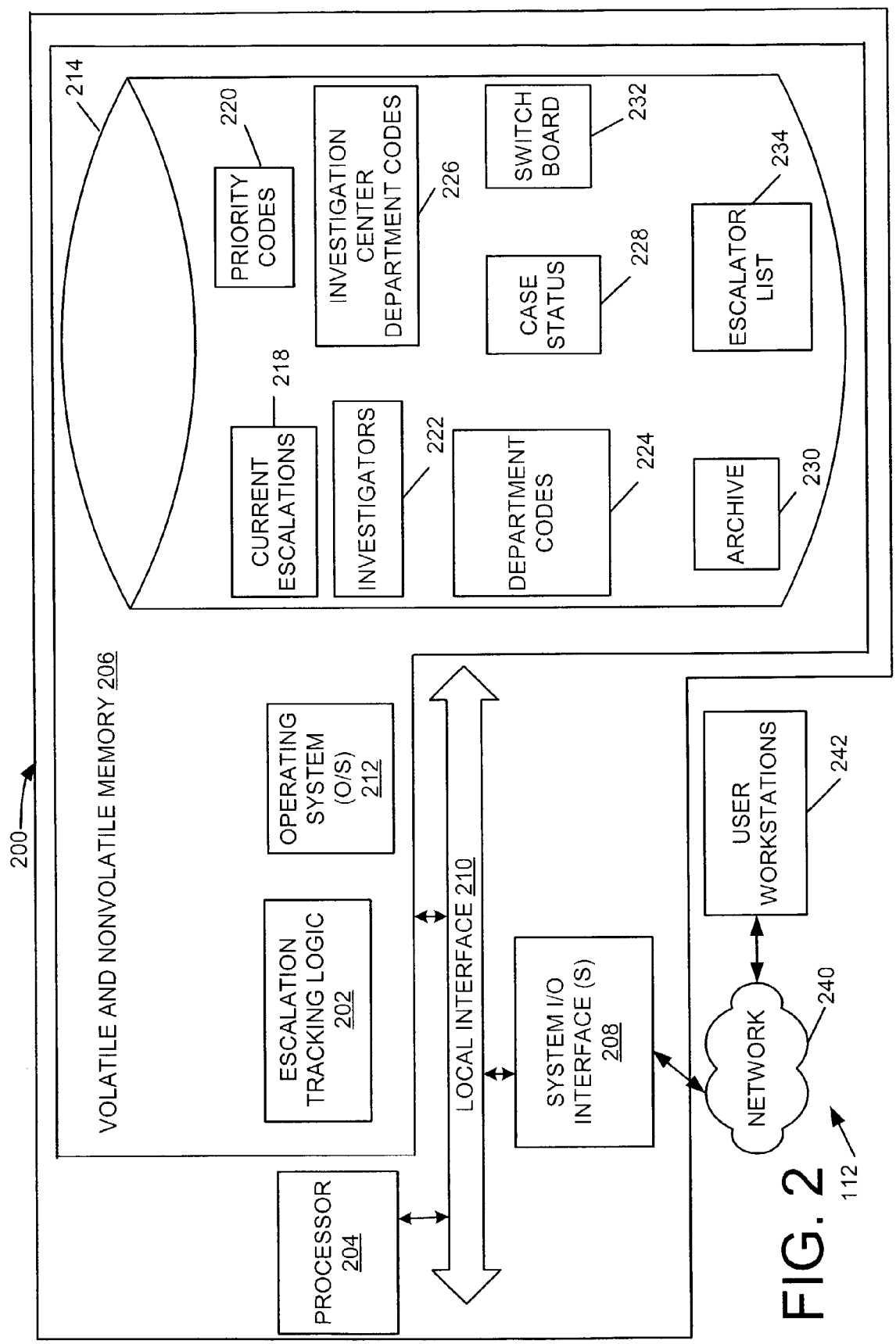
FIG. 2 is a block diagram depicting one preferred embodiment of a computing device that can be used to implement one preferred embodiment of an escalation tracking system.

FIG. 2 is a block diagram depicting one preferred embodiment of a computing device that can be used to implement the preferred embodiment of a billing error escalation system 112. Generally, in terms of hardware architecture, the billing error escalation system 112 preferably includes, inter alia, a server 200 connected through a network 240 to a plurality of user workstations 242, though other embodiments include standalone implementations. The server 200 preferably includes a processor 204, memory 206, a local interface 210, and system input and/or output (I/O) interfaces 208. In a preferred embodiment, the memory 206 is configured to include an operating system 212, escalation tracking logic 202, and tables 214. Microsoft Access™ is one example, among many others, of a software platform that can be utilized to provide the tables 214 and escalation tracking logic 202 to provide the functions discussed herein. The local interface 210 can be, for example but not limited to, one or more buses or other wired or wireless connections, as is known in the art. The local interface 210 may have additional elements, which are omitted for simplicity, such as controllers, buffers (caches), drivers, repeaters, and receivers, to enable communications. Further, the local interface 210 may include address, control, and/or data connections to enable appropriate communications among the aforementioned components.

The processing device 204 is preferably a hardware device for executing software, particularly that stored in memory 206. The processing device 204 can preferably be any custom made or commercially available processor, a central processing unit (CPU), an auxiliary processor among several processors, a semiconductor based microprocessor (in the form of a microchip or chip set), a macroprocessor, or generally any device for executing software instructions.

The memory 206 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the billing error escalation system 112. The software and/or firmware in memory may include one or more separate programs, each of which comprises an ordered listing of executable instructions for implementing logical functions. Further, the software in memory can include a suitable operating system (O/S) 212. The operating system essentially controls the execution of other computer programs, and provides scheduling, input-output control, file and data management, memory management, and communication control and related services.

When the escalation tracking logic 202 and tables 214 are implemented as a source program, then the program needs to be translated via a compiler, assembler, interpreter, or the like, which may or may not be included within the memory, so as to operate properly in connection with the O/S 212. Furthermore, the escalation tracking logic 202 and tables 214 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

When the escalation tracking logic 202 and tables 214 are implemented in software, they can preferably be stored on any computer-readable medium for use by or in connection with any computer related system or method. The escalation tarcking logic 202 and tables 214 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium.

When implemented as a hardware device for executing software, particularly that stored in memory, the billing error escalation system 112 and tables 214 can preferably include any custom made or commercially available processor, a central processing unit (CPU), an auxiliary processor among several processors, a semiconductor based microprocessor (in the form of a microchip or chip set), a macroprocessor, or generally any device for executing software instructions.

I/O devices (not shown) that may be connected to the system I/O interfaces 208 may preferably include input devices, for example but not limited to, a keyboard, mouse, scanner, microphone, etc. Furthermore, the I/O devices may also include output devices, for example but not limited to, a printer, display, etc. Finally, the I/O devices may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In a preferred embodiment, data for the billing error escalation system 112 is structured to include the plurality of tables 214 stored in memory 206 and accessible by the escalation tracking logic 202 and operating system 212. The escalation tracking logic 202 may be utilized to control data contained in the tables 214. In one preferred embodiment, the plurality of tables 214 includes data such as, current escalation data 218, priority codes data 220, data on investigators 222, department codes data 224, investigation center department codes data 226, case status data 228, archive escalation data 230, manager administrative (also referred to as switch board) data 232, and list of personnel authorized to escalate data 234, among others. The current escalation data 218 includes information on an open escalation record. The priority codes data 220 includes information for selecting the appropriate priority for the escalated case, for instance normal, high or critical. The data on investigators 222 includes information for selecting the appropriate investigator or personnel who created the escalation record. Preferably, the last name of the investigator is shown except where duplicate last names exist, in which case a first name or initial will be included. The department codes data 224 includes information on the appropriate department to handle the escalated case and when selected, automatically populates the contact information. The investigation center department codes data 226 includes information on the appropriate investigation center and when selected, automatically populates the contact information. The case status data 228 includes information for selecting the appropriate option for open escalated cases, for instance whether the case is open, closed, held or referred to another department, among others. The archive escalation data 230 provides for storing escalation records for escalated cases that have been removed from the escalation database. The manager administrative data 232 includes information utilized by a manager or system administrator for maintaining the billing error escalation system 112. The list of personnel authorized to escalate data 234 includes information on personnel authorized to escalate cases. In a preferred embodiment, a network 240, such as a local area network connects a plurality of user workstations 242 (only one shown for simplicity) to the system interface 208 whereby the users are provided with access to the data in the tables 214.

Figure 3:
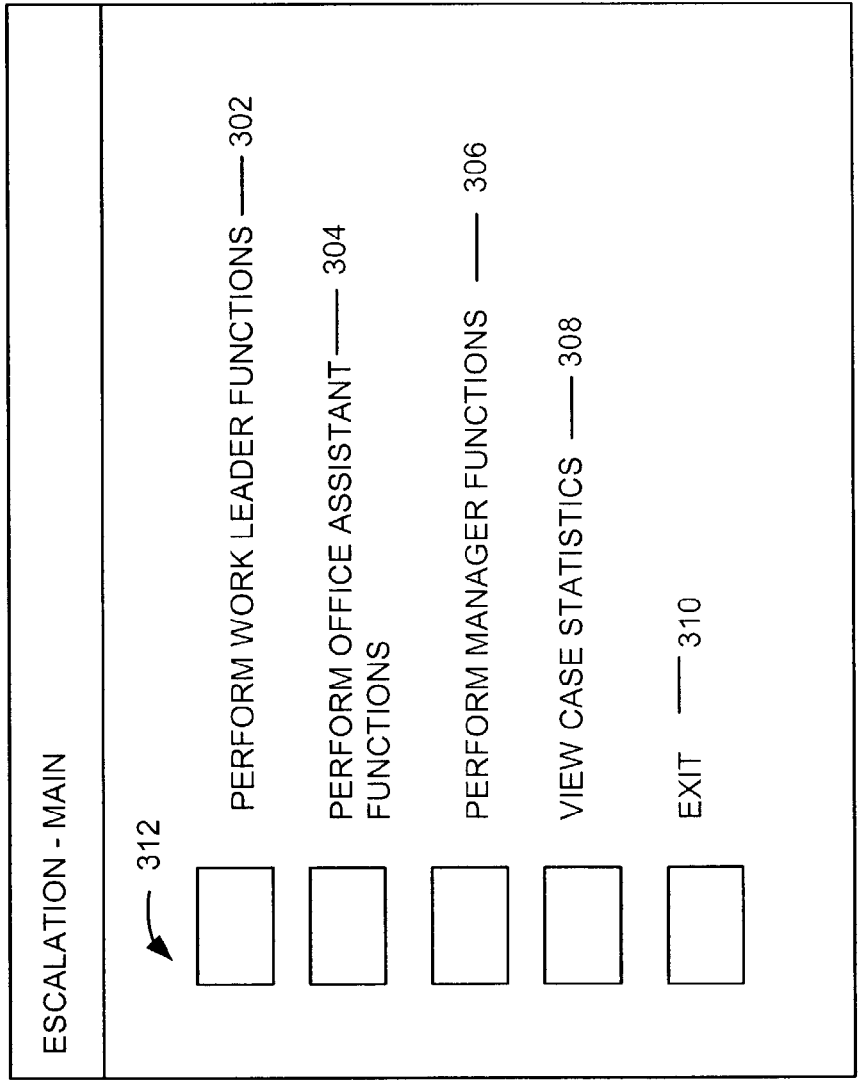
FIG. 3 is a block diagram depicting one preferred embodiment of a display of a main menu of an escalation tracking system.

FIG. 3 is a block diagram depicting one preferred embodiment of a display of a main menu 300 of an escalation tracking system 100. Upon entering the billing error escalation system 112, a user is presented with the main menu 300. The main menu 300 shown in FIG. 3 is an illustrative example of functions the billing error escalation system 112 can perform, among others. In a preferred embodiment, personnel that utilize the escalation tracking system 100 to manage and track escalations are organized into teams supported by a work leader. Preferably, a manager supervises several teams supported by the work leader. An office assistant provides support to the manager. In one preferred embodiment, the functions displayed on the main menu 300 reflect the organizational structure of the personnel who track escalation. As shown in FIG. 3, the functions that can be performed include work leader functions 302, office assistant functions 304 and manager functions 306. In addition, a user can view case statistics 308 and exit 310 the main menu. Each function 302–310 has an icon 312 associated therewith. Selecting the icon 312 brings up the appropriate associated functions.

Figure 4:
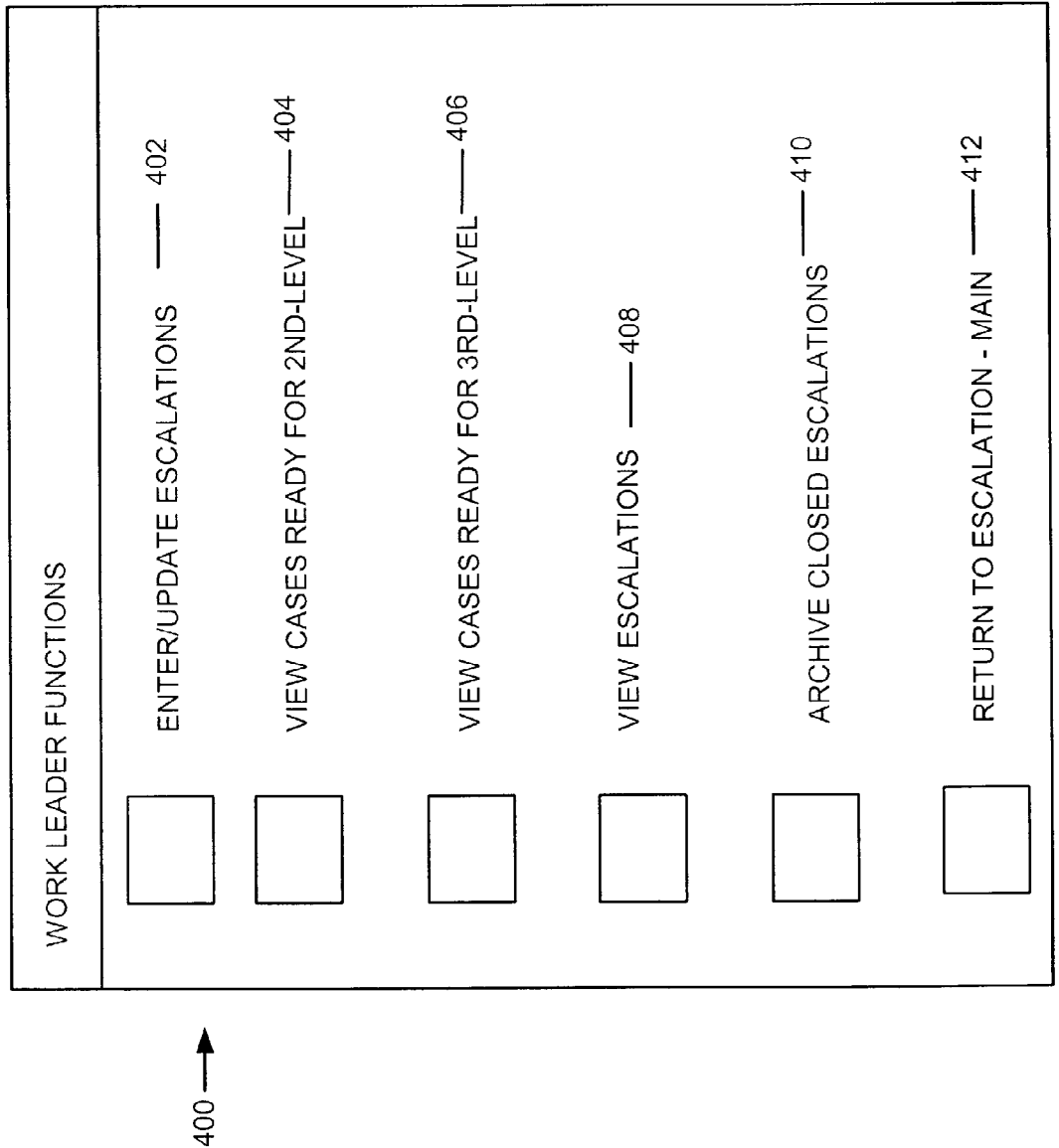
FIG. 4 is a block diagram depicting one preferred embodiment of a display of work leader functions of an escalation tracking system.

FIG. 4 is a block diagram depicting one preferred embodiment of a display of work leader functions 400 of an escalation tracking system 100. The work leader functions include entering and/or updating escalations 402, viewing cases ready for $2^{nd}$-Level (escalation) 404, viewing cases read for $3^{rd}$-Level (escalation) 406, viewing escalations 408, archiving closed escalations 410 and returning to the escalation main menu 412. In one embodiment, the billing error records 110 are electronically sent to the billing error escalation system 112. In another preferred embodiment, billing error records 110 from the billing systems 106 are received by an escalation investigator, such as a clerk. If the investigator is unsuccessful in resolving the billing error associated with the billing error record, for instance by failing to gain agreement from a responsible organization to correct the problem, the investigator escalates the problem to his/her work leader. The work leader enters a billing escalation into the billing error escalation system 112 for tracking until resolution. The work leader selects the enter/update escalation function 402 to access an escalation entry/update form (shown in FIG. 5). The work leader can also view escalation records by various levels of management such as cases ready to be escalated to the next level of management (i.e. $2^{nd}$-Level) and subsequent levels of management (i.e. $3^{rd}$-Level). The work leader can view escalations by category and preferably, has permission to move closed escalations to the escalation archive table 230. Upon completion of tasks, the work leader can exit to the escalation main menu.

Figure 5:
FIG. 5 is a block diagram depicting one preferred embodiment of a display of an escalation entry/update form of an escalation tracking system.

FIG. 5 is a block diagram depicting one preferred embodiment of a display of an escalation entry/update form 502 of an escalation tracking system 100. The escalation entry/update form 502 is utilized by the work leader to enter information associated with the billing error and relevant escalation information on the escalation entry/update form 502. In one embodiment, the form 502 includes sections for case information 504, escalation level 506, $1^{st}$-Level escalation data 508, $2^{nd}$-Level escalation data 510, $3^{rd}$-Level escalation data 512, and case status and closure data 514.

The case information 504 section of the form 502 includes an investigation center escalator ID with a drop-down list such that data entry personnel can select the appropriate ID from the drop-down list. The investigation center escalation ID is retrieved from the data in the investigation center department codes table 226. Department codes include a drop-down list feature. When the department code is selected, the contact information for that department will be automatically populated. If the desired code does not exist, by double clicking on the department code field, a form will be presented that provides for creating a new record in the department code table 224. The name of an investigator who issued the escalated case can be selected from the drop-down Investigator name list. A case number of the case being escalated can be entered in the Case Number field. A create date field provides for entering the date the case was sent to the department to which it is being escalated. A priority can be set in the Priority field by selecting the appropriate case priority (e.g., Normal, High, or Critical) from the drop-down list. The comments field provides for entering a brief descriptive comment to help identify the case problem and/or volume of messages in error. A delete case field is utilized to delete an escalation record. Once the escalation record to be deleted is accessed on the form 502, the user selects the delete case button by clicking on the trash can icon. The user will encounter a warning that a record is about to be permanently deleted from the database. In order to delete the record, the user must affirmatively choose to delete the record.

The escalation level section 506 of the form 502 provides for the selection of an appropriate escalation level (i.e., First, Second, or Third) from the drop-down list. In a preferred embodiment, cases will be initially entered as a $1^{st}$-Level escalation. An escalation record ID provides a unique identifier for each escalation record within the table of current escalations 218, allowing the user to advance to a specific record to be reviewed and/or changed.

The $1^{st}$-Level escalation section 508 of the form 502 provides for viewing and/or changing $1^{st}$-Level escalation contact information. A name of a $1^{st}$-Level contact is preferably populated by the selection of the appropriate department from the Department Code drop down list of the Case Information section 504 of the form 502. If the $1^{st}$-Level contact name is incorrect, the correct name can be entered in the field by entering the first name, middle initial and last name. A phone number corresponding to the escalation contact is automatically populated when the Department Code is selected. If the phone number is incorrect, the correct phone number can be entered in the field by entering the 10-digit telephone number of the $1^{st}$-Level escalation contact. A date escalated to $1^{st}$ field provides for entering the date (mm/dd/yy) that the case was escalated to the $1^{st}$-Level contact. In a preferred embodiment, the billing error escalation system 112 utilizes the date escalated to $1^{st}$-Level contact as a date to trigger the date that the case should be escalated to $2^{nd}$-Level Contact. For example, management, or other personnel, can establish expected timeframes in which a case should be escalated from $1^{st}$-Level, to $2^{nd}$-Level, to $3^{rd}$-Level management. For instance, if management expects a case to be escalated from $1^{st}$-Level to $2^{nd}$-Level within 30 days, (or any designated time frame) then on the $31^{st}$ day, upon entering the billing error escalation system 112, the manager responsible for the case will receive a list of cases ready for $2^{nd}$-Level escalation. In a preferred embodiment, the escalation tracking logic 202 compares the current date with dates escalated to a particular management level, and when the number of days between the two exceeds a set threshold, the escalation record is retrieved from the current escalations table 218 and sent to the manager's processing device for retrieval. This process is repeated for $2^{nd}$-Level cases. For example, if an unresolved case is to be escalated from $2^{nd}$-Level management to $3^{rd}$-Level management within 45 days, on the $46^{th}$ day, the manager responsible for the case will receive a list of cases that should be escalated that day to $3^{rd}$-Level.

The $2^{nd}$-Level escalation section 510 of the form 502 provides for viewing and/or changing $2^{nd}$-Level escalation contact information. A name of a $2^{nd}$-Level contact is preferably populated by the selection of the appropriate department from the Department Code drop down list of the Case Information section 504 of the form 502. If the $2^{nd}$-Level contact name is incorrect, the correct name can be entered in the field by entering the first name, middle initial and last name. A phone number corresponding to the escalation contact is automatically populated when the Department Code is selected. If the phone number is incorrect, the correct phone number can be entered in the field by entering the 10-digit telephone number of the $2^{nd}$-Level escalation contact. A date escalated to $2^{nd}$ field provides for entering the date (mm/dd/yy) that the case was escalated to the $2^{nd}$-Level contact. A scrubbed for $2^{nd}$ field provides for an indication that the record has been scrubbed.

The $3^{rd}$-Level escalation section 508 of the form 502 provides for viewing and/or changing $3^{rd}$-Level escalation contact information. A name of a $3^{rd}$-Level contact is preferably populated by the selection of the appropriate department from the Department Code drop down list of the Case Information section 504 of the form 502. If the $3^{rd}$-Level contact name is incorrect, the correct name can be entered in the field by entering the first name, middle initial and last name. A phone number corresponding to the escalation contact is automatically populated when the Department Code is selected. If the phone number is incorrect, the correct phone number can be entered in the field by entering the 10-digit telephone number of the $3^{rd}$-Level escalation contact. A date escalated to $3^{rd}$ field provides for entering the date (mm/dd/yy) that the case was escalated to the $3^{rd}$-Level contact. A scrubbed for $3^{rd}$ field provides for an indication that the record has been scrubbed.

The case status and closure data section 514 of the form 502 provides for entering case status and closure date information. Preferably, escalations should be only entered for open cases. In one embodiment, a drop-down list in the case status field provides personnel an option to section from open, closed, held, manager hold, and referred to another department selections. The work leader utilizes the case closure date if the case has been closed following a $1^{st}$-Level escalation, the date of which the case was closed is entered. The view area 516 of the form 502 provides for filtering the form 502 to show only escalations for a specific investigation center escalator ID code by using filter buttons, such as ESC01, ESC02, etc., which represents the investigation center for the specific work leader entering (and responsible for) the escalation. In a preferred embodiment of the invention, the number of work leaders entering and tracking escalations is limited to that which can easily be displayed on an entry/update vehicle, such as an escalation entry/update form 502. To remove the filter and restore all escalations, a user clicks on the ALL filter option of the view area 516 of the form 502. By accessing a find function by for instance clicking on the glasses 518, or other symbol, a find menu (not shown) can access a specific case. A specific case number can be entered and that record, if available, will be returned. The escalation entry/update form 502 will be presented with appropriate fields pre-populated. The user can then review the form 502 and make appropriate updates to fields on the form 502 as necessary.

Upon entering applicable case and escalation information, another escalation/entry update form 502 can be obtained by either pressing the Tab key (not shown) past the last field to advance the form to the next record, or clicking on a next-record navigation key (not shown). The information on the escalation/entry update form 502 can be saved and closed and returned to the Work Leader functions 400 menu.

FIG. 6 is a block diagram depicting one preferred embodiment of a display of a report showing escalations by investigation center escalator report 600 of an escalation tracking system 100. This report 600 provides for viewing cases that have been entered in the escalation billing error escalation system 112 for a specific investigation center escalator ID code 602. A user requesting information regarding investigation center escalator ID code 602 (Inv Ctr esc ID) ESC03 for example, can view details in the following categories: case number 604, escalation ID (esc ID) 606, investigator 608, department code (dept code) 610, priority 612, escalation level (esc level) 614, status 616 and comments 618. The escalation report 600 lists cases for the specified investigation center escalator ID code 602 and can be sorted by case number. In addition, the escalator report 600 can be sorted by the listed categories, including for instance, by status of the case such as, open, closed, held, referred, or manager hold.

Figure 7:
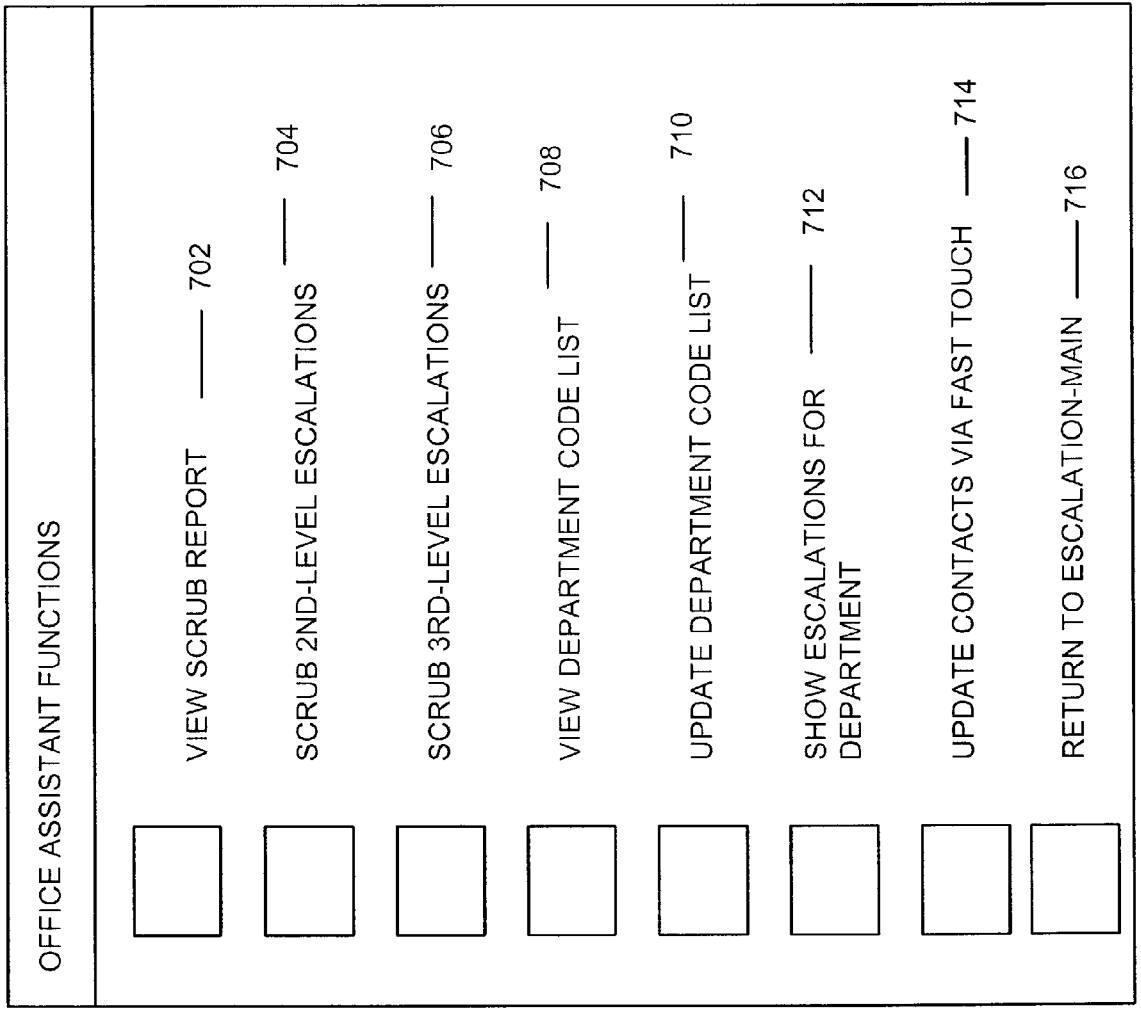
FIG. 7 is a block diagram depicting one preferred embodiment of a display of office assistant functions of an escalation tracking system.

FIG. 7 is a block diagram depicting one preferred embodiment of a display of office assistant functions 700 of an escalation tracking system 100. An office assistant periodically logs into the billing error escalation system 112 to determine if there are escalated cases that need to be scrubbed. Scrubbing involves verifying that the escalated cases are still open and if so, contacting the listed escalation contacts for the case and confirming that the contact is indeed responsible for the case, as well as the name, level and contact information for each of the escalation contacts. If the contact information is correct, the office assistant marks the case as scrubbed. If the contact information is incorrect, the office assistant obtains the correct information and updates the escalation contact information for the case, then marks the case as scrubbed. Scrubbing ensures the escalation case is sent to the proper person and the billing error escalation system 112 reflects the current information for the escalation contact.

Upon logging into the billing error escalation system 112, the office assistant selects perform office assistant functions 304 from the escalation-main menu 300. The office assistant encounters the office assistant functions menu 700 shown in FIG. 7. The selection of functions includes view scrub report 702, scrub $2^{nd}$-Level escalations 704, scrub $3^{rd}$-Level escalations 706, view department code list 708, show escalations for department 712, update contacts via fast touch 714, and return to escalation-main 716. Upon selecting the view scrub report 702, the office assistant can review a listing of "unscrubbed" cases in the billing error escalation system 112.

FIG. 8 is a block diagram depicting one preferred embodiment of a display of an escalation scrub report 800 of an escalation tracking system 100. The escalation scrub report 800 provides a listing of unscrubbed cases in the billing error escalation system 112 that includes cases ready to be escalated to $2^{nd}$-Level and/or $3^{rd}$-Level. The office assistant can use the escalation scrub report 800 as a baseline to which corrections and/or updates will be applied, and as a worksheet for recording updated information obtained by various methods such as telephone calls, checking corporate records, among others. In one embodiment, the escalation scrub report 800 includes information such as identification and level (ID/level) 802 of the escalation contact, investigation center escalation ID and investigator (Inv Ctr esc ID/investigator) 804, department 806, case number 808, priority 810, case date 812 (e.g. date escalation was entered), comments 814, the name of $1^{st}$, $2^{nd}$, and $3^{rd}$ Level escalation contacts 816, and the telephone numbers of $1^{st}$, $2^{nd}$, and $3^{rd}$ Level escalation contacts 818. The office assistant has access privileges that allow him/her to update any of the fields shown in the escalation scrub report 800. Once the updated information is obtained, the office assistant applies the updates and corrections to the appropriate database 214 of the billing error escalation system 112. For example, the office assistant can access a $2^{nd}$-Level escalation scrub form 704 on the office assistant function menu 700 to apply updates and corrections to $2^{nd}$ level escalation information.

FIG. 9 is a block diagram depicting one preferred embodiment of a display of an escalation scrub form 900 of an escalation tracking system 100. The escalation scrub form 900 provides access to contact information necessary to complete an effective escalation. The escalation scrub form 900 shown in FIG. 9 is utilized to update contact information as necessary. In one embodiment, the escalation scrub form 900 includes sections for case information 902, escalation level 904, $1^{st}$-Level escalation data 906, $2^{nd}$-Level escalation data 908, and $3^{rd}$-Level escalation data 910.

The case information section 902 includes information previously populated, preferably by the work leader. For example an investigation center escalator ID field includes the ID of the investigation center escalator. The investigator field includes the name of the case investigator who issued the escalated case. The department code field includes the department code. The case number field includes the case number of the case being escalated. The create date field includes the date the case was sent to the department to which it is being escalated. A priority field includes the priority of the case as determined by the escalator, work leader or manager. Illustrative examples of priorities include N for normal, H for high, and C for critical. The comments field includes a brief description of the problem.

The escalation level section 904 of the form 900 reflects the escalation level of the case. The escalation level field provides for the selection of an appropriate escalation level (i.e., First, Second, or Third) from the drop-down list. In a preferred embodiment, cases will be initially entered as a $1^{st}$-Level escalation. The escalation ID field provides a unique identifier for each escalation record within the table of current escalations 218, allowing the user to advance to a specific escalation record to be reviewed and/or changed.

The $1^{st}$-Level escalation section 906 of the form 900 provides for viewing $1^{st}$-Level escalation contact information that preferably was previously provided by the work leader. The $1^{st}$-Level escalation contact includes the name of a $1^{st}$-Level contact, a phone number, and the date the case was escalated to the $1^{st}$-Level contact.

The $2^{nd}$-Level escalation section 908 of the form 900 provides for viewing and/or updating $2^{nd}$-Level escalation contact information. In a preferred embodiment, the office assistant contacts the individual shown on a contact directory, or otherwise, as the $2^{nd}$-Level contact for the $1^{st}$-level contact. Upon ascertaining the correct name and telephone number of the $2^{nd}$-Level contact, the office assistant enters/updates the name of the $2^{nd}$-Level contact (first name, middle initial, last name) as necessary. The telephone number of the $2^{nd}$-Level contact is entered/updated as necessary. Once the office assistant has confirmed the $2^{nd}$-Level contact information and entered/updated the $2^{nd}$-Level escalation scrub form 900, the office assistant checks the box in the $2^{nd}$-Level contact scrubbed field to indicate that the contact information has been scrubbed for $2^{nd}$-Level escalation.

Figure 10:
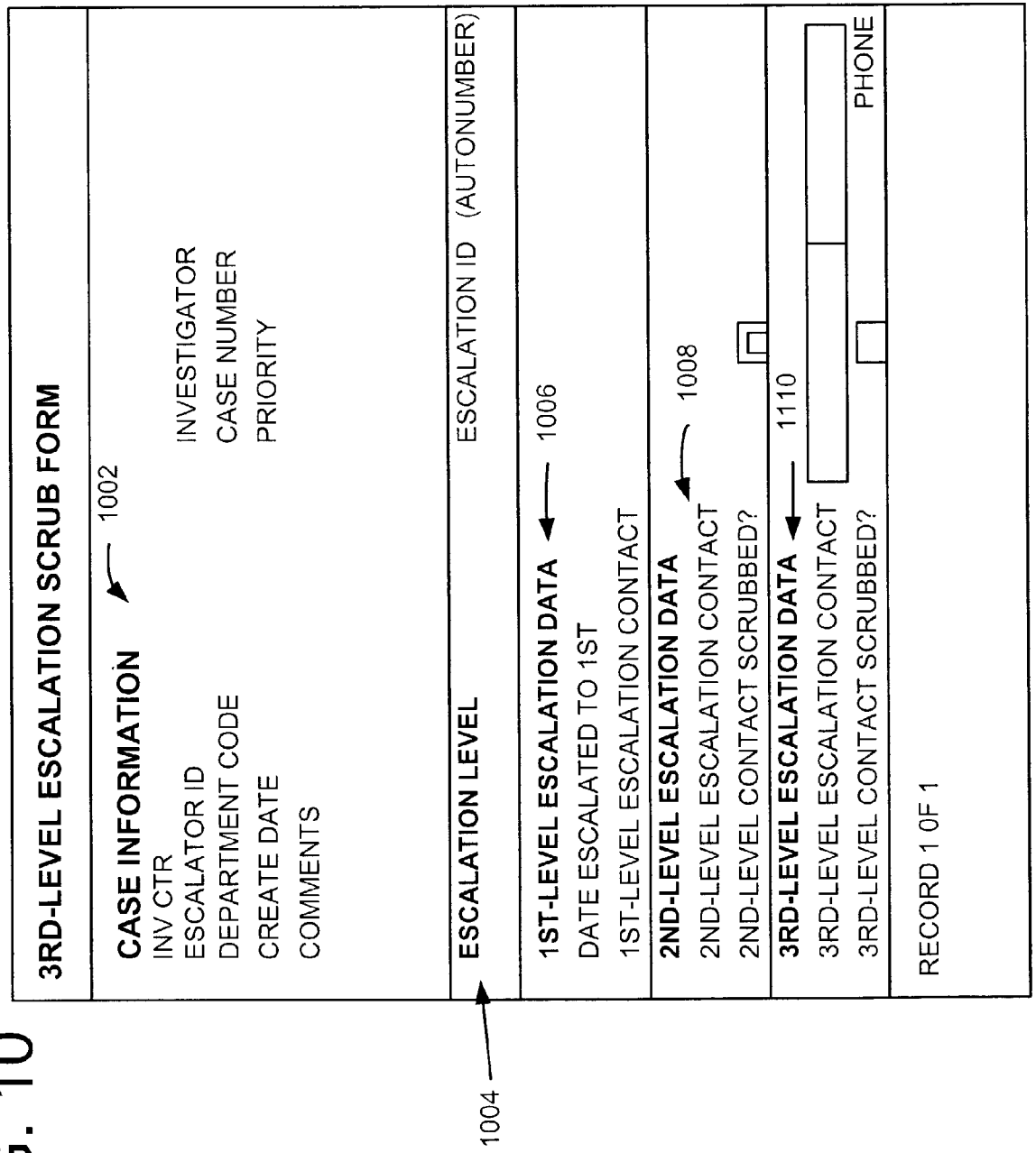
FIG. 10 is a block diagram depicting another preferred embodiment of a display of an escalation scrub form of an escalation tracking system.

FIG. 10 is a block diagram depicting another preferred embodiment of a display of an escalation scrub form 1000 of an escalation tracking system 100. The escalation scrub form 1000 provides access to contact information necessary to complete an effective escalation to the $3^{rd}$-Level. The escalation scrub form 1000 shown in FIG. 10 is utilized to update $3^{rd}$-Level contact information as necessary. In one embodiment, the escalation scrub form 1000 includes sections for case information 1002, escalation level 1004, $1^{st}$-Level escalation data 1006, $2^{nd}$-Level escalation data 1008, and $3^{rd}$-Level escalation data 1010. An office assistant, or other personnel, can view the escalation scrub report 800 to view unscrubbed cases in the billing error escalation system 112 for both the $2^{nd}$-Level and $3^{rd}$-Level. This report can be utilized as a baseline to determine which, if any, $3^{rd}$-Level contact information should be updated. The office assistant can access the $3^{rd}$-Level escalation scrub form 1000 by clicking on the scrub $3^{rd}$-Level escalations function 706 on the office assistant functions form 700. The $3^{rd}$-Level escalation section 1010 of the form 1000 provides for viewing and/or changing $3^{rd}$-Level escalation contact information. The office assistant can enter/update the name of a $3^{rd}$-Level contact, and the phone number of the $3^{rd}$-Level contact. Once the office assistant has confirmed the $3^{rd}$-Level contact information and entered/updated the $3^{rd}$-Level escalation scrub form 1000, the office assistant checks the box in the $3^{rd}$-Level contact scrubbed field to indicate that the contact information has been scrubbed for $3^{rd}$-Level escalation. Preferably, the $2^{nd}$-Level contact for this case has been scrubbed as indicated by a check (or other indication) in the box by the $2^{nd}$-Level contact scrubbed field of the $2^{nd}$-Level escalation data section 1008 of the form 1000. If the $2^{nd}$-Level contact has not been scrubbed, in one embodiment, the office assistant should proceed to scrub the $2^{nd}$-Level contact information before proceeding to the next case.

FIG. 11 is a block diagram depicting a display of an alternative preferred embodiment of an escalation archive report 1100 of an escalation tracking system 100. Closed cases can be placed in the archive table 230 of the billing error escalation system 112. A work leader or other personnel can access the archive table 230 by clicking on the archive closed escalations functions 410 of the work leader functions menu 400. Once closed cases have been archived, a work leader or other personnel can review archived escalations. The escalation archive report 1100 includes an identification number (ID) 1102, investigation center escalator identification (Inv Ctr esc ID) 1104, department and case number (dept case) 1106, priority (prio) 1108, escalation date and level (esc data level) 1110, $1^{st}$-Level date and $1^{st}$-Level contact 1112, $2^{nd}$-Level data and $2^{nd}$-Level contact 1114, $3^{rd}$-Level date and $3^{rd}$-Level contact 1116, closure date 1118 and archive date 1120. The escalation archive report 1100 lists fields populated with pertinent data for each archived case, including the date the case was removed from the escalation database and moved to the archive table 230. For example, the case corresponding to ID #3 is a case that was initially escalated on Sep. 03, 2001 and subsequently escalated to $1^{st}$-Level of management on Oct. 3, 2001. This case was closed on Nov. 3, 2001 without having to escalate it to $2^{nd}$-Level or $3^{rd}$-Level of management. The case was moved from the escalation database to the archive table 230 on Nov. 15, 2001. In another example, the case corresponding to ID #9 was originally escalated on Jan. 5, 2002 and subsequently escalated to $1^{st}$-Level on Feb. 5, 2002, to $2^{nd}$-Level on Apr. 5, 2002 and to $3^{rd}$-Level on Jun .5, 2002. The case was closed on Jun. 8, 2002 and archived on Jun. 17, 2002.

Figure 12:
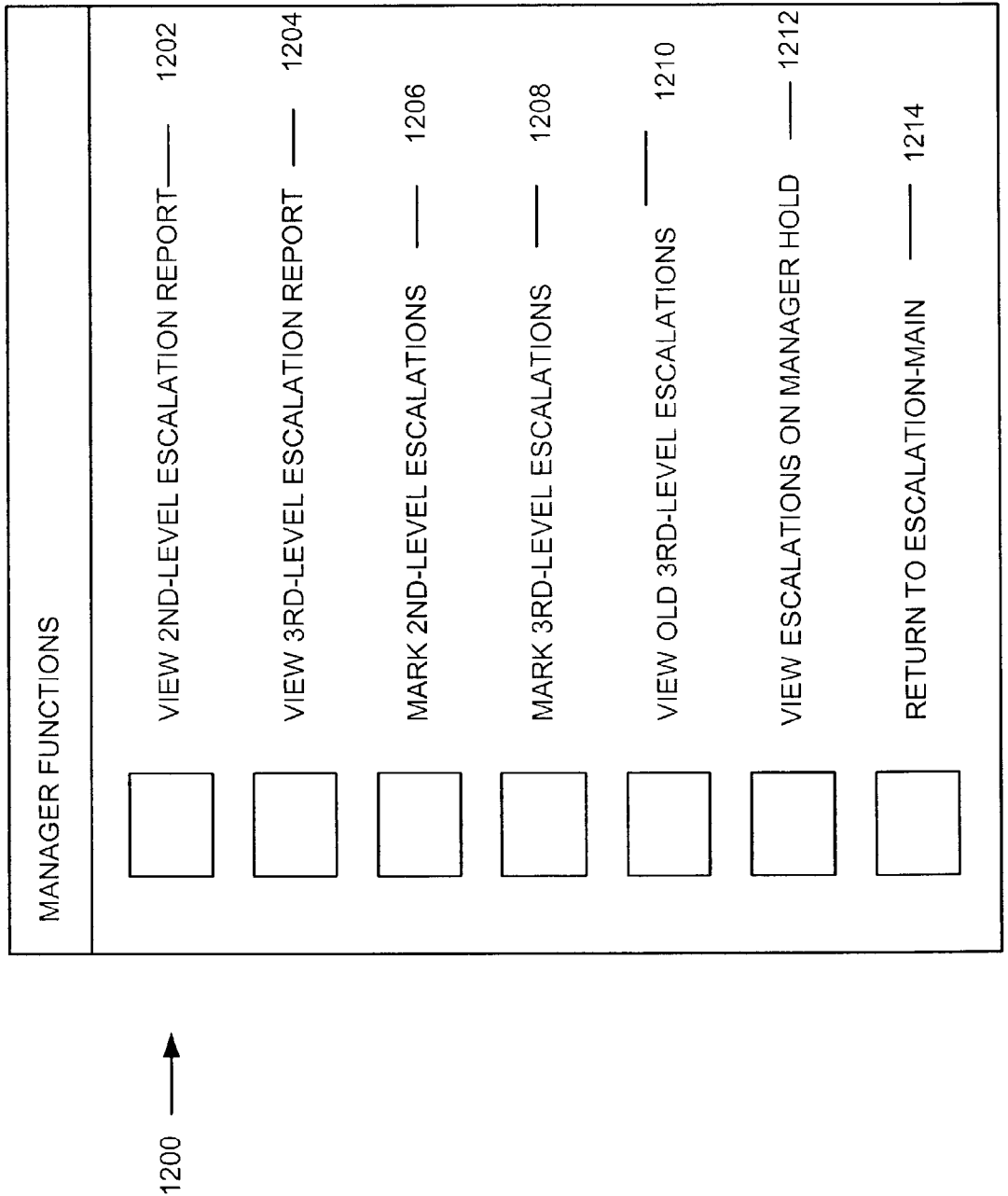
FIG. 12 is a block diagram depicting a preferred embodiment of a display of manager functions of an escalation tracking system.

FIG. 12 is a block diagram depicting a preferred embodiment of a display of manager functions 1200 of an escalation tracking system 100. A manager such as an investigation center manager, or other responsible personnel, should enter the billing error escalation system 112 to determine if there are any scrubbed cases awaiting $2^{nd}$-Level escalation. In one preferred embodiment, the menu selections include view $2^{nd}$-Level escalation report 1202, view $3^{rd}$-Level escalation report 1204, mark $2^{nd}$-Level escalations 1206, mark $3^{rd}$-Level escalations 1208, view old $3^{rd}$-Level escalations 1210, view escalations on manager hold 1212, and return to escalation-main 1214. The manager can access the $2^{nd}$-Level escalation report by clicking on the view $2^{nd}$-Level escalation report 1202 button on the manager functions menu 1200.

Once cases have been escalated, for instance, an email message has been sent to the appropriate higher level of management, the manager marks the case as "escalated" clicking on the mark $2^{nd}$-Level escalations 1206 or mark $3^{rd}$-Level escalations 1208 buttons on the manager functions 1200 menu. The action of marking the cases as escalated updates tables 214 in the billing error escalation system 112. Preferably, the manager is given several opportunities to abort the marking action and affirmative selects to modify data in the tables 214 to complete the marking action.

FIG. 13 is a block diagram depicting a display of a manager escalation report 1300 of an escalation tracking system 100. The manager escalation report 1300 provides the information to escalate the open cases to a $2^{nd}$-Level manager. The $2^{nd}$-Level escalation report 1300 includes escalator ID (esc ID) 1302, investigation center escalation ID and name of investigator (Inv Ctr esc ID/Investigator) 1304, department (dept) 1306, case number (case) 1308, priority (pri) 1310, date case was entered (case date) 1312, comments 1314, $1^{st}$-Level escalation date 1316, $1^{st}$-Level escalation contact 1318, and $2^{nd}$-Level escalation contact 1320. In one preferred embodiment, the manager escalates the case to the $2^{nd}$-Level escalation contact via email. Preferably, the manager exports the $2^{nd}$-Level escalation report 1300 from, for instance, Microsoft Access™ as a file, such as a Microsoft Word™ document, as is known in the art, and attaches the file to an email that is sent to the appropriate responsible manager for resolution, thereby creating an "escalation email." Once the cases have been escalated, i.e., the escalation email has been sent, the manager preferably marks the cases as "escalated" (as described above) by clicking on the mark $2^{nd}$-Level escalations button next to function 1206 on the manager functions menu 1200. The manager repeats the process for cases scrubbed and awaiting $3^{rd}$-Level escalation.

FIG. 14 is a block diagram depicting a display of a preferred embodiment of a manager escalation report, for example a $3^{rd}$-Level escalations report 1400 of an escalation tracking system 100. The manager escalation report 1400 provides the information to escalate the open cases to a director level. The $3^{rd}$-Level escalations report 1400 includes escalator ID (esc ID) 1402, investigation center escalation ID and name of investigator (Inv Ctr esc ID/Investigator) 1404, department (dept) 1406, case number (case) 1408, priority 1410, date case was enter (case date) 1412, comments 1414, $1^{st}$-Level and $2^{nd}$-Level escalation dates 1416, $1^{st}$-Level, $2^{nd}$-Level, and $3^{rd}$-Level escalation contacts and phone numbers 1418. In a preferred embodiment, the manager exports the report from, for instance, Microsoft Access™ as a file, to Microsoft Word™ document, as is known in the art, and attaches the file to an email that is sent to the appropriate responsible manager for resolution, creating an "escalation email." The manager preferably forwards the $3^{rd}$-Level escalations report 1400 to the appropriate director with comments stating that the cases are ready for $3^{rd}$-Level escalation. Once the cases have been escalation, i.e., the escalation email has been sent, the manager should mark the cases as "escalated" by clicking on the mark $3^{rd}$-Level escalated button 1208 on the manager functions menu 1200.

FIG. 15 is a flow chart depicting general functionality (or method), in accordance with one preferred embodiment, of an implementation of an escalation tracking system. The process begins at 1502. At 1504 a billing error message is received. In one preferred embodiment, personnel responsible for resolving billing errors receive error messages or exception reports, or other notification that a billing error has occurred. In another preferred embodiment, the billing error message is sent directly to the billing error escalation system. At 1506, the personnel attempt to resolve the billing error. If the personnel resolve the billing error, the process ends at 1508. If the personnel are unable to resolve the billing error, at 1510, the personnel escalate the billing error for resolution. At 1512, the billing error is systematically tracked until resolution. In a preferred embodiment, the billing error is tracked using a billing error escalation system. At 1506 a determination is made as to whether the billing error has been resolved. If yes, the process stops at 1508. If no, the problem continues to be escalated and tracked until resolved.

Figure 16:
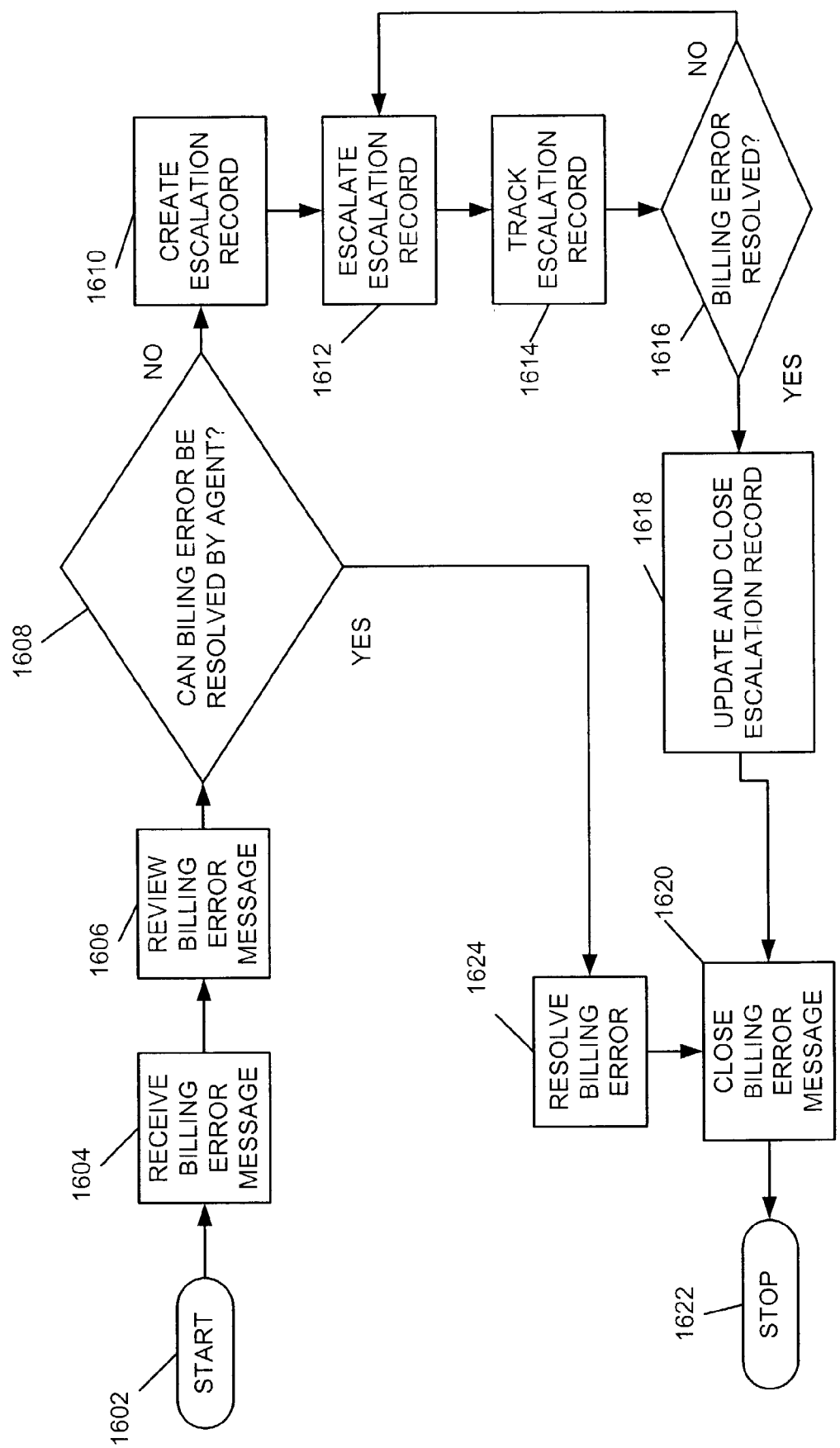
FIG. 16 is a flow chart depicting more specific functionality, in accordance with one preferred embodiment, of an implementation of an escalation tracking system.

FIG. 16 is a flow chart depicting more specific functionality (or method), in accordance with one preferred embodiment, of an implementation of an escalation tracking system. The process begins at 1602. At 1604, a billing error message is received. In a preferred embodiment, personnel responsible for resolving billing errors receive the billing error message. At 1606, the personnel review the billing error message. At 1608, a determination is made as to whether the personnel or agent can resolve the billing error. The personnel examine the billing error and determine the nature of the problem and the organization responsible for resolving the problem. Non-limiting examples of resolution steps taken by personnel include reviewing pending service orders and contacting appropriate personnel to resolve discrepancies between service order and subscriber bill, arranging to disconnect service as required on a disconnect order, or arranging to have proper service plan reflected on subscriber's bill. If personnel determine that they are able to resolve the billing error, at 1624, the personnel resolve the billing error. At 1620, the personnel close the billing error message. The process ends at 1622.

If users determine that they are unable to resolve the billing error, at 1610, an escalation record (also referred to as a trouble ticket or case) is created in a billing error escalation system. At 1612, an escalation occurs and the escalation record is forward to appropriate managers for resolution of the problem. In a preferred embodiment, an electronic mail (email) message is created that includes the escalation record attached to the email message utilizing for example, Microsoft Word™ and the user's electronic mail system. The email message is sent to the appropriate manager in the department responsible for resolving the billing error. At 1614, the escalation record created in the billing error escalation system is tracked. In a preferred embodiment, tracking the escalation record includes for example, maintaining information about the escalation such as status of problem, contact information, and status of the escalation. At 1616, a determination is made as to whether the billing error has been resolved. If not, the escalated record is forwarded to manager at 1612. In a preferred embodiment, the escalation record is escalation to the next level of management in the responsible organization for resolution of the billing error. If the billing error is resolved, at 1618, the escalation record is updated and closed. At 1620, the billing error message is closed. The process ends at 1622.

Figure 17:
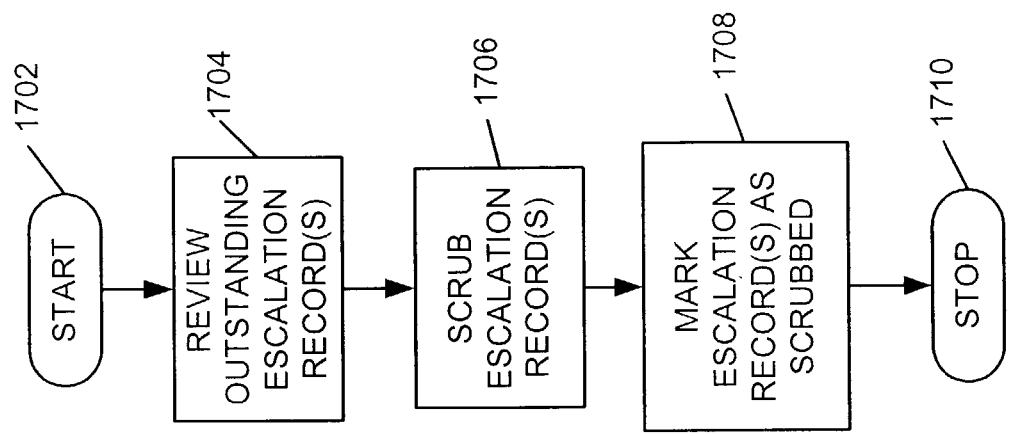
FIG. 17 is a flow chart depicting general functionality, in accordance with one preferred embodiment, of an implementation of scrubbing escalation records of an escalation tracking system.

FIG. 17 is a flow chart depicting general functionality, in accordance with one preferred embodiment, of an implementation of scrubbing escalation records of an escalation tracking system. The process begins at 1702. At 1704, outstanding escalation records are reviewed. At 1706, the escalation records are scrubbed. At 1708, the scrubbed escalation records are marked as scrubbed. The process ends at 1710.

Figure 18:
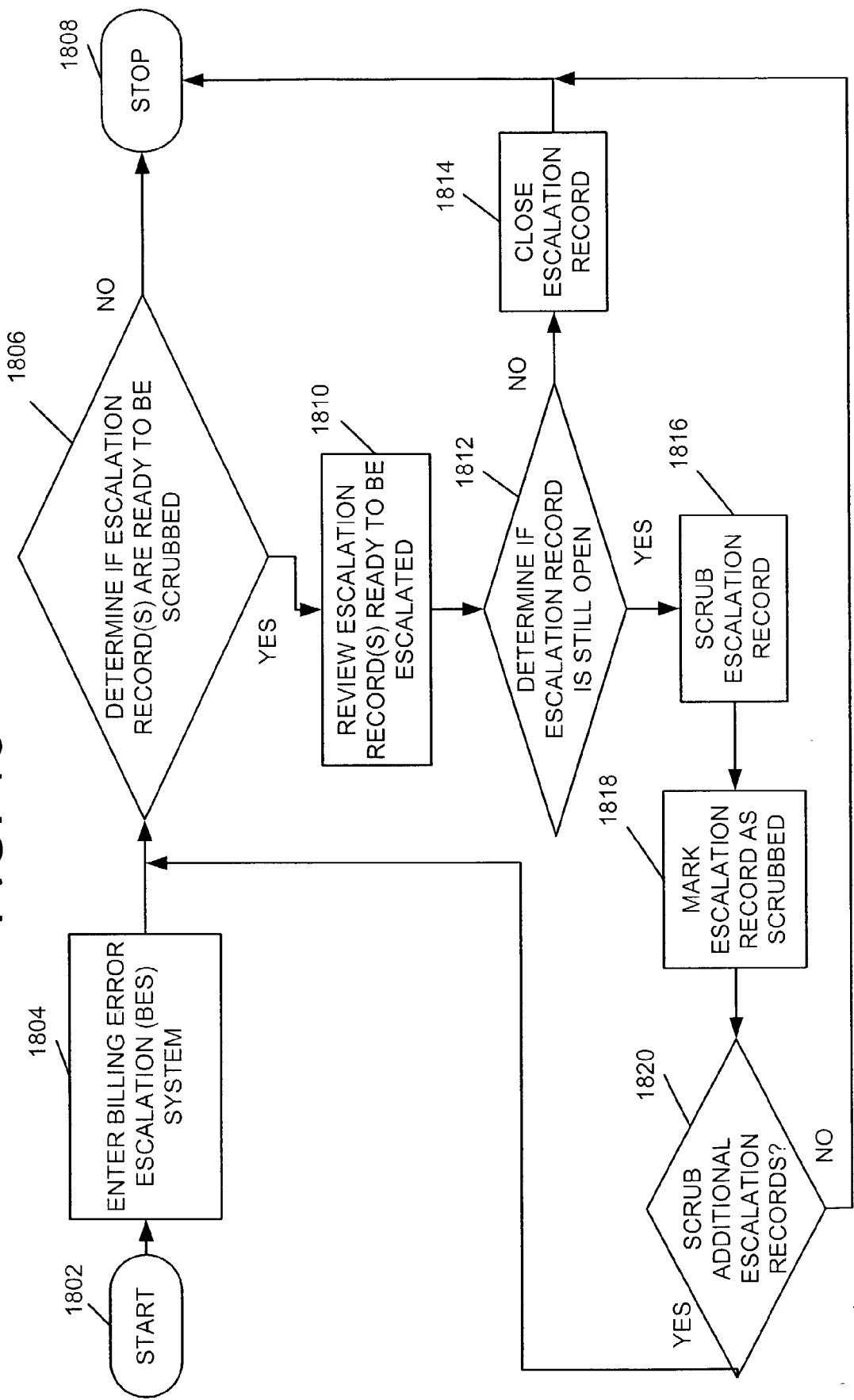
FIG. 18 is a flow chart depicting more specific functionality, in accordance with one preferred embodiment, of an implementation of scrubbing escalation records of an escalation tracking system.

FIG. 18 is a flow chart depicting more specific functionality (or method), in accordance with one preferred embodiment, of an implementation of scrubbing escalation records of an escalation tracking system. The process begins at 1802. At 1804, personnel with appropriate authorizations enter the billing error escalation (BES) system. At 1806, a determination is made as to whether an escalation record is ready to be scrubbed. In a preferred embodiment, an office assistant, or other individual, of a billing resolution center is designated as the individual with appropriate authorization and permission to scrub escalation records. The BES system is configured to compare the current date with the date an escalation record was entered in the system. Management or other personnel can establish appropriate time frames for escalating escalation records to a higher level of management for resolution. For example, an escalation record may be escalated to a first level of management after being open for 30 days. Escalation to a second level of manager can be set to occur after the expiration of 60 days. An escalation to a director level (or third level) of management can occur after the expiration of 90 days. The escalation time frames can vary per escalation record and/or per level of management. For instance, if a billing error is worth large sums of money or large numbers of subscribers are impacted by the error, the escalation time frames can be established such that the escalation records is escalation after a few days or any other time frame. When a match occurs between the current date and time frame for escalating as indicated by appropriate personnel, the escalation record is considered ready to be escalated (and scrubbed) and the BES system moves the escalation record to a section in the BES system that is accessible by for example, an office assistant. If no escalation records are ready to be scrubbed, the process ends at 1808.

If escalation records are ready to be scrubbed, at 1810, the office assistant reviews the escalation record for cases ready to be escalated. Reviewing the record can include reviewing the status of the case, contact names, telephone numbers and dates of escalations. At 1812, the office assistant determines if the escalation record is still an open case. This determination may involve verifying other pertinent records or contacting appropriate personnel to determine if the billing error still exists. If the billing error has been resolved or the escalation record should no longer be open, at 1814, the office assistant closes the escalation record. If the escalation record is still open, at 1816, the office assistant scrubs the escalation record. In a preferred embodiment, scrubbing an escalation record involves contacting, preferably by telephone, the individual listed on the escalation record as the next contact level. The office assistant verifies with the contact that they are responsible for the area indicated as a problem on the escalation record. In addition, the office assistant verifies the name, telephone number, and email address for the contact and their next level of management. Scrubbing ensures that the escalation record will be sent to the right person who can assist in resolving the billing error and serves as unofficial notice to the contact that the escalation is coming. If any contact information is incorrect or missing, the office assistant has authorization and permission to update the contact information in the appropriate fields of the escalation record. Once the record is scrubbed, at 1818, the office assistant marks the record as scrubbed. This marking provides notification to others who may access the escalation record that it has been scrubbed and they can be assured that the escalation is still open, valid, and the contact information is correct. At 1820, a determination is made as to whether additional escalation records need to be scrubbed. If yes, the process continues at 1806. If no, the process ends at 1808.

FIG. 19 is a flow chart depicting functionality (or method), in accordance with one preferred embodiment, of an implementation of reviewing and escalating scrubbed escalation records of an escalation tracking system. The process begins at 1902. At 1904, personnel enter the billing error escalation system. In a preferred embodiment, the person who enters the billing error escalation system has authority and appropriate permissions to forward the escalation record for resolution, such as a manager, among others. At 1906, the manager views scrubbed escalation records that are ready for escalation. Escalation records are ready for escalation if they have been scrubbed, the time frame for action at the current level of escalation has passed, and the billing error remains unresolved. At 1908, the manager escalates the escalation record. In a preferred embodiment, the manager creates an email message to the contact at the appropriate level listed in the escalation record, and attaches the escalation record to the email message. Because the escalation record has been scrubbed, the manager has confidence that the contact is the appropriate individual to receive the escalation record to assist with the resolution of the billing error. The process continues until all escalation records ready for escalation are escalated. At 1910, the process ends.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A billing error escalation system, comprising:
   a processing device in the billing escalation system configured to provide for creating, tracking and forwarding escalation records of internally generated errors, wherein a specific escalation record is generated after failure of initial attempts to process through a billing system to resolve an internal billing error, wherein a first escalation level of a plurality of escalation levels of an escalation system is entered; and
   a plurality of databases in the billing escalation system adapted to communicate with the processing device, the plurality of databases configured to provide data on the escalation records of internally generated errors.

2. The system of claim 1, wherein the plurality of databases further comprises a plurality of tables having data.

3. The system of claim 2, wherein the data further comprises at least one of information on current escalations, priority codes, investigators, department codes, investigation center department codes, case status, switch board, archives or escalator list.

4. The system of claim 1, further comprising a display for displaying information on the escalation records.

5. The system of claim 4, wherein the information displayed on the escalation records includes at least one of a main menu, work leader functions menu, escalation entry/update form, report of escalations by escalator, office assistant functions menu, escalations scrub report, escalation scrub form, escalation archives report, manager functions, or escalations by level report.

6. A system for tracking billing errors, comprising:
   a telecommunications network adapted to collect billing information for telephone transactions;
   a billing system coupled to the telecommunications network, the billing system providing a billing error record upon the occurrence of an internal billing error; and
   a billing error escalation system for automatically tracking the billing error record with a specific escalation record created after failure of initial attempts to process through a billing system to resolve an internal billing error, wherein a first escalation level of a plurality of escalation levels of an escalation system is entered.

7. The system of claim 6, wherein the billing error escalation system further comprises a processing device configured to provide for creating, tracking, and escalation records, and a plurality of databases adapted to communicate with the processing device, the plurality of databases configured to provide data on the escalation records.

8. The system of claim 7, wherein the databases further comprises a plurality of tables and wherein the plurality of tables further comprises data that includes at least one of information on current escalations, priority codes, investigators, department codes, investigation center department codes, case status, switch board, archives or escalator list.

9. A method for tracking escalated billing error messages, comprising the steps of:
creating a specific internal error escalation record after failure of initial attempts to process through a billing system to resolve an internal billing error, wherein a first escalation level of a plurality of escalation levels of an escalation system is entered;
scrubbing the internal error escalation record; and
tracking the internal error escalation record.

10. The method of claim 9, further comprising escalating a scrubbed escalation report.

11. The method of claim 9, further comprising receiving a billing error message.

12. The method of claim 9, further comprising resolving the billing error message.

13. The method of claim 9, further comprising displaying escalation records that are due within a designated time period.

14. The method of claim 9, further comprising determining whether the escalation record requires escalation for resolution.

15. The method of claim 9 further comprising closing the escalation record when a billing error is resolved.

16. The method of claim 15, wherein the closing the escalation record when a billing error is resolved further comprises archiving closed escalation records.

17. The method of claim 15, further comprises transferring a closed escalation record to an archive file.

18. The method of claim 9, further comprising viewing the escalation records using a selected indicator.

19. The method of claim 18, wherein the viewing the escalation records using a selected indicator is performed with the selected indicator comprising at least one of a department escalation identification, status, department code, by escalation archive, or escalation record ready for next level of escalation.

20. The method of claim 9, further comprising automatically displaying escalation records that are ready for escalation to a next level of authority.

21. The method of claim 9, further comprising deleting an escalation record.

22. The method of claim 9, further comprising changing a status of the escalation record.

23. The method of claim 9, further comprising maintaining a department code table.

24. The method of claim 9, further comprising viewing status of an escalation record that comprises at least one of a level of escalation, by escalation records on hold, by numbers of escalated records by level, or by age of closed escalation records.

25. A method for scrubbing an escalation record, comprising the steps of:
reviewing outstanding specific internal error escalation records generated after failure of initial attempts to process through a billing system to resolve an internal billing error, wherein a first escalation level of a plurality of escalation levels of an escalation system is entered;
verifying accuracy of information on the internal error escalation records; and
marking the specific internal error escalation records as scrubbed.

26. The method of claim 25, further comprising receiving escalation records ready to be scrubbed.

27. The method of claim 25, wherein the verifying accuracy of information on the escalation records further comprises confirming that the escalation records represents an outstanding billing error, contacting escalation contacts to confirm that the escalation contacts are responsible for correcting the billing error and updating as necessary contact information on the escalation record.

28. The method of claim 27, further comprising closing escalation records when the escalation records do not represent outstanding billing errors.

29. The method of claim 25, wherein the reviewing outstanding escalation records further comprises determining whether escalation records are ready to be scrubbed.

30. The method of claim 29, wherein the determining whether escalation records are ready to be scrubbed further comprises receiving escalation records that exceed a designated time frame for resolution of billing error.

31. A computer-readable medium having a computer program for a system for tracking billing escalations, comprising:
logic configured to create a specific internal billing error escalation record after failure of initial attempts to process through a billing system to resolve an internal billing error, wherein a first escalation level of a plurality of escalation levels of an escalation system is entered;
logic configured to scrub the escalation record; and
logic configured to track the escalation record.

* * * * *